US012433980B2

(12) United States Patent
Buckberry et al.

(10) Patent No.: US 12,433,980 B2
(45) Date of Patent: Oct. 7, 2025

(54) OPTIMISING DIALYSER PERFORMANCE

(71) Applicant: Quanta Dialysis Technologies Ltd., Alcester (GB)

(72) Inventors: Clive Buckberry, Warwick (GB); Mark Wallace, Stourbridge (GB)

(73) Assignee: QUANTA DIALYSIS TECHNOLOGIES LIMITED, Warwick (GB)

( * ) Notice: Subject to any disclaimer, the term of this patent is extended or adjusted under 35 U.S.C. 154(b) by 281 days.

(21) Appl. No.: 17/916,517

(22) PCT Filed: Mar. 30, 2021

(86) PCT No.: PCT/GB2021/050791
§ 371 (c)(1),
(2) Date: Sep. 30, 2022

(87) PCT Pub. No.: WO2021/198678
PCT Pub. Date: Oct. 7, 2021

(65) Prior Publication Data
US 2023/0211061 A1    Jul. 6, 2023

(30) Foreign Application Priority Data

Mar. 31, 2020    (GB) ..................................... 2004738

(51) Int. Cl.
*A61M 1/16*        (2006.01)
*A61M 1/14*        (2006.01)
(Continued)

(52) U.S. Cl.
CPC .......... *A61M 1/1688* (2014.02); *A61M 1/155* (2022.05); *A61M 1/156* (2022.05);
(Continued)

(58) Field of Classification Search
CPC .... A61M 1/1688; A61M 1/155; A61M 1/156; A61M 1/1565; A61M 1/1603;
(Continued)

(56) References Cited

U.S. PATENT DOCUMENTS 4,209,402 A     6/1980  Gentles
11,951,295 B2 *  4/2024  Court .................. A61M 1/3623
(Continued)

FOREIGN PATENT DOCUMENTS

AU      2021246962 A1   10/2021
CA         2896286 A1    7/2014
(Continued)

OTHER PUBLICATIONS

English Translation of Patent Publication CN 104968376A, published Oct. 7, 2015. (Year: 2015).*
(Continued)

*Primary Examiner* — Joseph W Drodge
(74) *Attorney, Agent, or Firm* — The Marbury Law Group, PLLC

(57) ABSTRACT

A pump and valve arrangement (201), a dialysis system (10) comprising the pump and valve arrangement 201 and a method of operating a pump and valve arrangement (201). The pump and valve arrangement (201) has a dialyser having a semi-permeable membrane. The pump and valve arrangement (201) delivers dialysis fluid to and from the dialyser (12). The pump and valve arrangement (201) has a control system (450) configured to shuttle dialysis fluid between an inlet pump assembly and the dialyser (12) one or more times so as to agitate the surface of the semi-permeable membrane of the dialyser (12).

12 Claims, 7 Drawing Sheets

(51) Int. Cl.
  *A61M 1/26* (2006.01)
  *B01D 61/24* (2006.01)
  *B01D 61/30* (2006.01)
  *B01D 65/02* (2006.01)

(52) U.S. Cl.
  CPC ........ *A61M 1/1565* (2022.05); *A61M 1/1603* (2014.02); *A61M 1/1694* (2013.01); *A61M 1/26* (2013.01); *B01D 61/243* (2013.01); *B01D 61/30* (2013.01); *B01D 65/02* (2013.01); *B01D 2313/18* (2013.01); *B01D 2313/243* (2013.01); *B01D 2321/02* (2013.01)

(58) Field of Classification Search
  CPC .................. A61M 1/1694; A61M 1/26; A61M 2205/7554; A61M 2205/7563; A61M 1/1635; A61M 1/01; A61M 1/14; A61M 1/1621; A61M 1/1656; A61M 1/267; A61M 1/34; A61M 2205/128; A61M 1/1649; A61M 1/168; A61M 1/1682; B01D 61/243; B01D 61/30; B01D 65/02; B01D 2313/18; B01D 2313/243; B01D 2321/02; B01D 2321/2066; B01D 2321/2083; F04B 43/06; F04B 23/04; F04B 41/06; F04B 49/00; F04B 49/02; F04B 49/22
  See application file for complete search history.

(56) References Cited

U.S. PATENT DOCUMENTS

2018/0349477 A1* 12/2018 Jaech ................. G06F 16/9535
2019/0125952 A1* 5/2019 Jansson ............... A61M 1/1694
2023/0211061 A1 7/2023 Buckberry et al.

FOREIGN PATENT DOCUMENTS

| CN | 104968376 A | * | 10/2015 | .......... A61M 1/1601 |
| CN | 105764541 A | * | 7/2016 | .............. A61M 1/16 |
| CN | 115361979 A | | 11/2022 | |
| EP | 4126101 A1 | | 10/2021 | |
| GB | 2593733 A | | 10/2021 | |
| JP | 2023521010 A | | 5/2023 | |
| WO | 8911899 A1 | | 12/1989 | |
| WO | 2015022537 A1 | | 2/2015 | |
| WO | 2021198678 A1 | | 10/2021 | |

OTHER PUBLICATIONS

Escapement translation of patent publication CN104968376A, published Oct. 7, 2015 (Year: 2015).*

Pe2e english translation of patent publication CN10576541A, published Jul. 13, 2016 (Year: 2016).*

Escapement english translation of patent publication CN10576541A, published Jul. 13, 2016 (Year: 2016).*

European Patent Office, "International Search Report and Written Opinion," issued in related International Patent Application No. PCT/GB2021/050791, mailed Jun. 25, 2021 (8 pages).

European Patent Office, "International Preliminary Report on Patentability," issued in related International Patent Application No. PCT/GB2021/050791 dated Sep. 29, 2022 (6 pages).

Canadian Patent Office, "Office Action," issued in related Canadian Patent Application No. 3,171,877 dated Jan. 8, 2024 (6 pages).

* cited by examiner

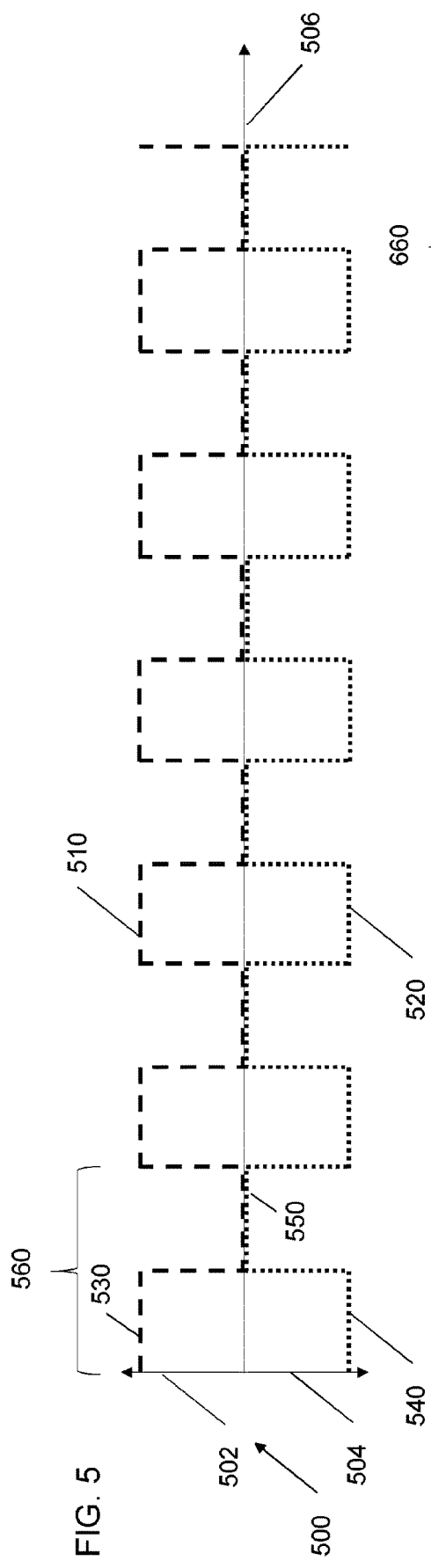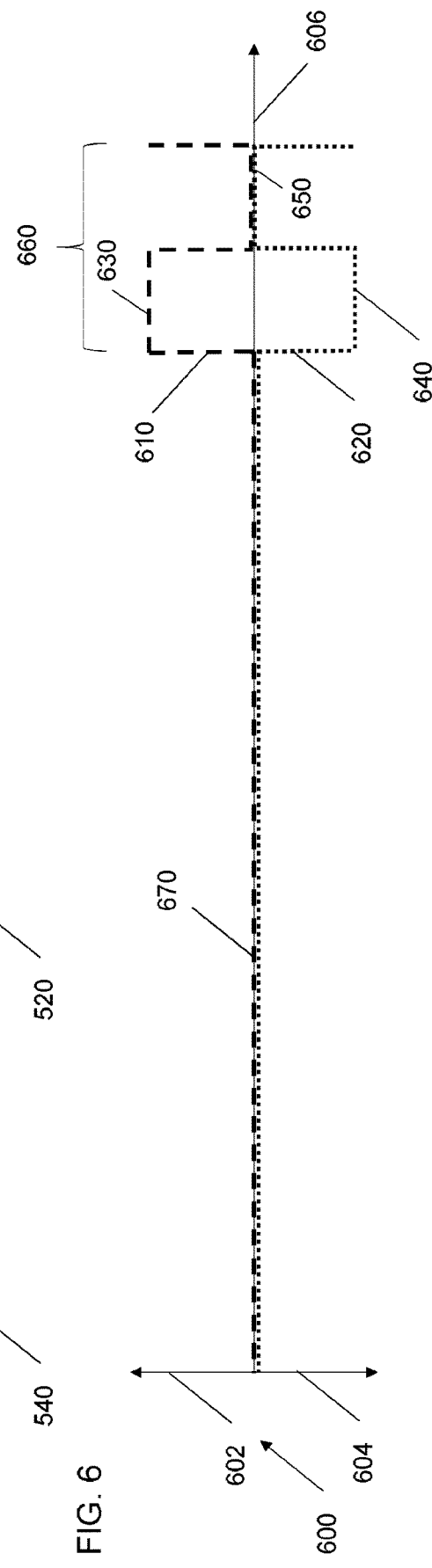

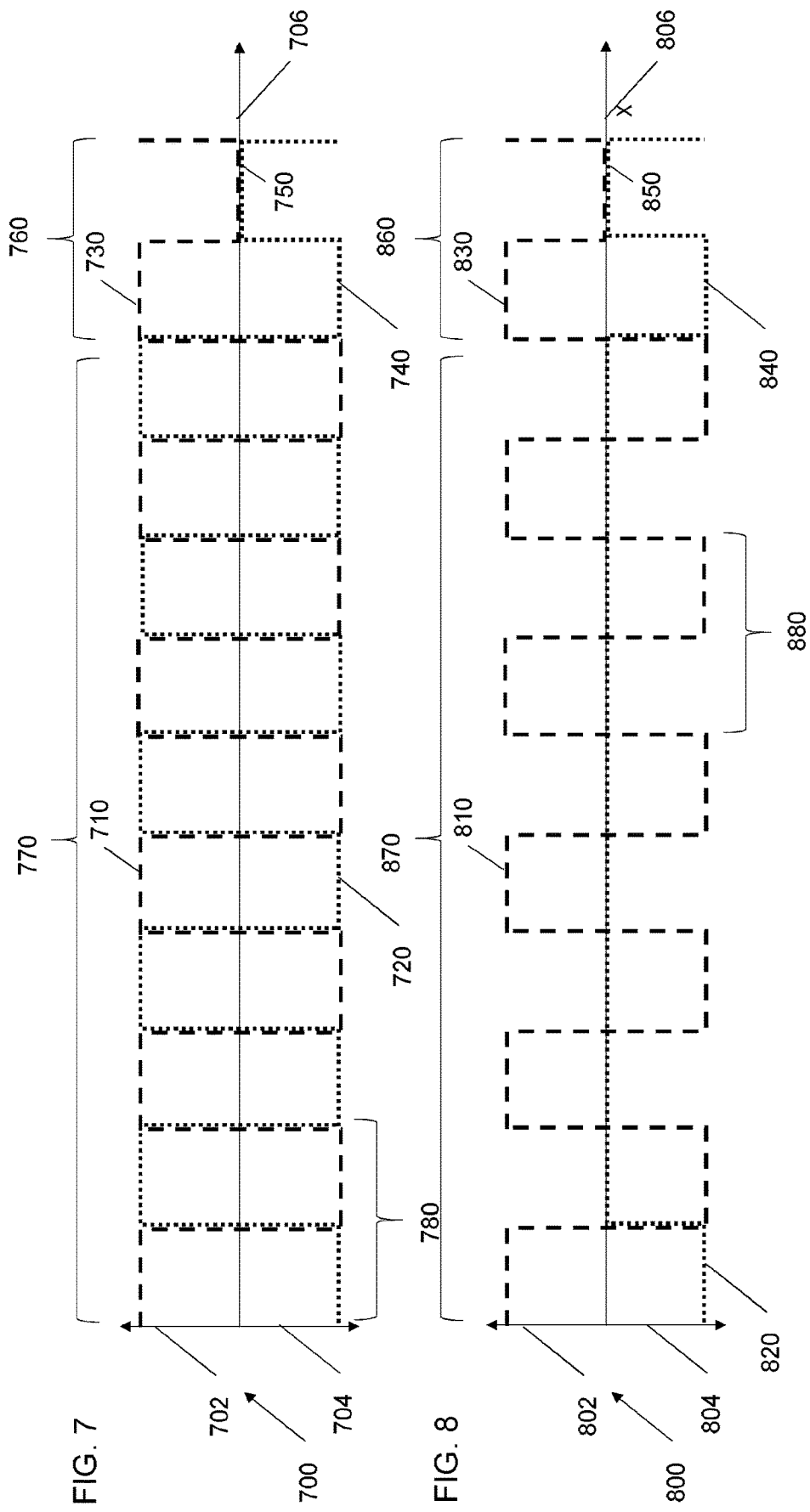

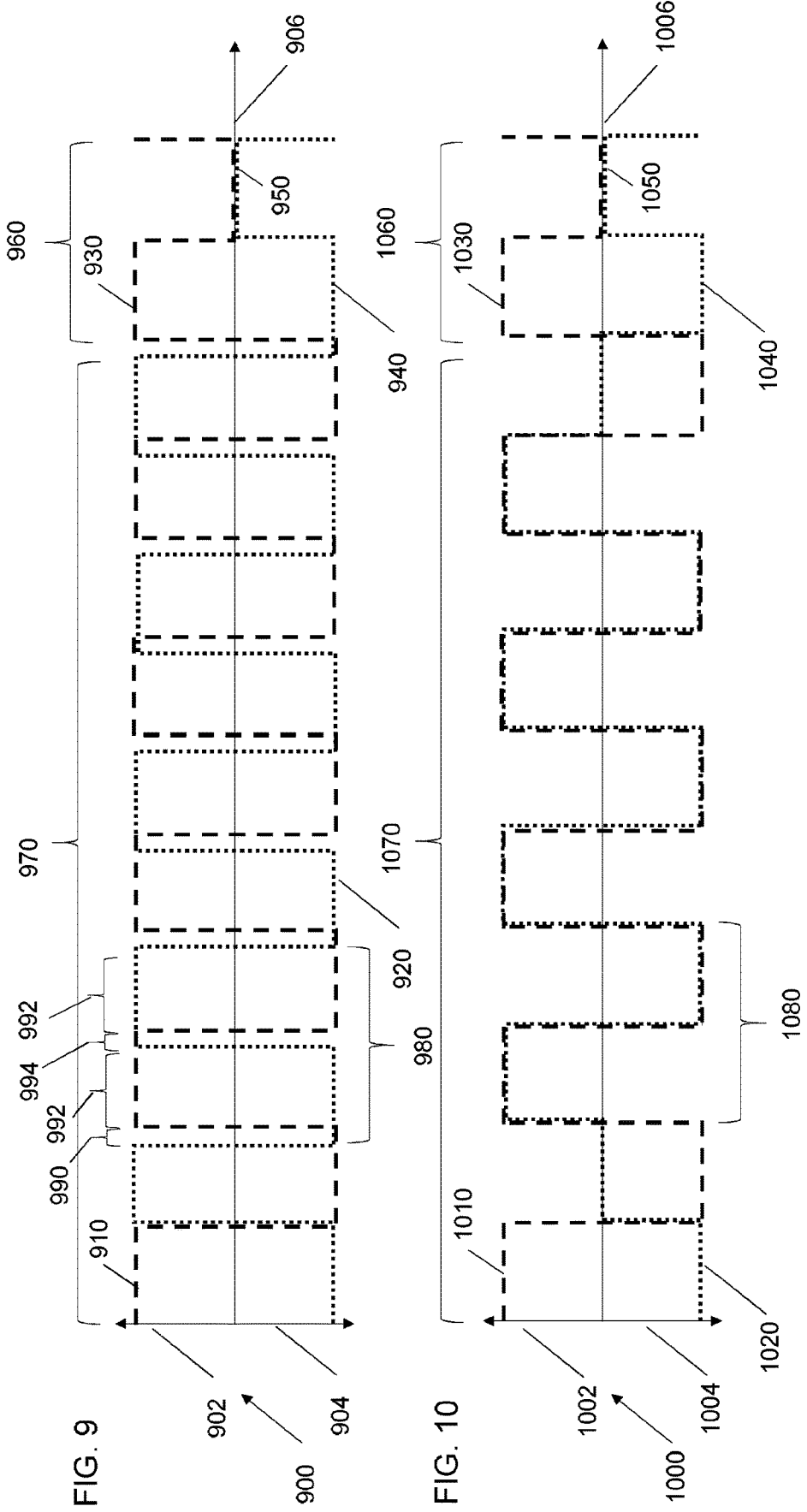

OPTIMISING DIALYSER PERFORMANCE

This application is a National Stage Entry entitled to and hereby claims priority under 35 U.S.C. §§ 365 and 371 to corresponding PCT Application No. PCT/GB2021/050791, filed Mar. 30, 2021, entitled "Optimising Dialyser Performance", which in turn claims priority to G.B. Patent Application No.: 2004738.7, filed Mar. 31, 2020, entitled the same. Each of the above noted disclosures is incorporated herein by reference in its entirety.

FIELD OF THE INVENTION

The present invention relates to operation of a dialysis system, and in particular to optimising dialyser performance.

BACKGROUND TO THE INVENTION

Patients suffering from reduced kidney function rely on external blood treatments to remove harmful waste substances that build up in their blood over time. One of the most common methods of treatment is haemodialysis. An example of haemodialysis is set out in the applicant's previous application WO2015/022537.

Haemodialysis typically involves two networks of fluid passageways running adjacent to one another in a counter-current flow arrangement. This arrangement of fluid pathways is provided in a device known as a dialyser. Blood is passed through one set of tubules and dialysis fluid is passed through the other. The pH and osmotic potential of the dialysis fluid is adapted such that waste compounds built up in the blood diffuse from the blood into the dialysis fluid through a semi-permeable membrane which separates the blood and dialysis fluid sides of the network of fluid passageways. Thus the movement of waste compounds is by diffusion, with dialysis fluid moving along the dialyser membrane longitudinally.

Haemodialysis provides a method of gradually removing waste materials with a molecular weight from 50 to 60000 Daltons from the blood by diffusion, minimising fatigue to the patient. However, there are some disadvantages associated with haemodialysis.

One disadvantage of haemodialysis is that medium molecular weight molecules (mMW) dissolved in the blood (for example β-2 microglobulin), which are typically between 1000 and 15000 Daltons, are difficult to remove completely from the blood using haemodialysis. It can take a long time to reduce the levels of these substances in the blood to acceptable levels, which may not be convenient for a patient. One other disadvantage of haemodialysis is that molecules can become attached to the semi-permeable membrane, causing a film to build up on the membrane over time. This is detrimental to the operation of the dialyser and the dialysis system as a whole.

An alternative approach to remove waste molecules from the blood is to use a form of convective operation, such as haemodiafiltration.

Classically, haemodiafiltration involves administering sterile dialysis fluid to the blood either by employing a large hydrostatic potential to force sterile dialysis fluid across a semi-permeable membrane into the blood or by directly adding it to the blood; and then pulling the sterile dialysis fluid, complete with dissolved waste products, back across the semi-permeable membrane for subsequent disposal. This type of blood treatment is not limited by diffusion, as sterile dialysis fluid is allowed to mix directly with the blood and returned to the dialysis fluid by a process termed "solute drag". Thus the movement of waste compounds is by convection, with dialysis fluid moving across the dialyser membrane transversely.

One known haemodiafiltration method of directly adding dialysis fluid to the blood is controlled by infusing the blood side of the dialyser with sterile solution at a constant flow rate. However, increased patient monitoring may be necessary, and this type of treatment may not suit all patients.

An example of haemodiafiltration is also set out in the applicant's previous applications WO2015/022537 and WO2018/142153, the contents of which are incorporated herein by reference.

Known methods may not allow much control over, or tailoring of, the infusion. Known methods may require extra haemodiafiltration dialysis fluid preparation steps, extra haemodiafiltration dialysis fluid filtration and sterilisation steps, and an additional pump or pumps to move the dialysis fluid independently of the blood pump or pumps.

There is therefore a need for improvements in the above described methods and devices.

SUMMARY OF THE INVENTION

According to a first aspect of the present invention there is provided a pump and valve arrangement comprising: a dialyser having a semi-permeable membrane; an inlet pump assembly operable to deliver a first volume of dialysis fluid from a dialysis fluid source to the dialyser in an inlet pump cycle having a dialysis fluid delivery stroke; an outlet pump assembly operable to remove a second volume of dialysis fluid from the dialyser and deliver the second volume of dialysis fluid away from the dialyser in an outlet pump cycle having a dialysis fluid removal stroke; a control system operable to operate the inlet pump assembly in the inlet pump cycle, and operable to operate the outlet pump assembly in the outlet pump cycle, wherein either the control system is further operable to operate the inlet pump assembly to shuttle the first volume of dialysis fluid between the inlet pump assembly and the dialyser one or more times so as to agitate a surface of the semi-permeable membrane of the dialyser, or the control system is further operable to operate the outlet pump assembly to shuttle the second volume of dialysis fluid between the outlet pump assembly and the dialyser one or more times so as to agitate a surface of the semi-permeable membrane of the dialyser.

The control system may be further operable to synchronise the inlet pump assembly and outlet pump assembly so as to shuttle the first volume of dialysis fluid between the inlet pump assembly and the outlet pump assembly via the dialyser one or more times. Transmembrane pressure within the dialyser is thereby unaffected and a greater flow velocity across the entire length of the surface of the semi-permeable membrane of the dialyser may be effected.

The control system may be operable to maintain inactive the other of the inlet pump assembly or the outlet pump assembly when operating the inlet pump assembly to shuttle or operating the outlet pump assembly to shuttle. Transmembrane pressure within the dialyser is thereby affected and a HDF effect is achieved.

The control system may be operable to synchronise the inlet pump assembly and outlet pump assembly with a delay so as to shuttle the first volume of dialysis fluid between the inlet pump assembly and the outlet pump assembly via the dialyser one or more times. The length of delay may be settable by the control system.

The control system may be operable to synchronise the inlet pump assembly and outlet pump assembly so as to shuttle the first volume of dialysis fluid between the inlet pump assembly and the dialyser, and the second volume of dialysis fluid between the outlet pump assembly and the dialyser, at the same time, one or more times.

The inlet pump assembly and the outlet pump assembly may both be operable to deliver a first volume of dialysis fluid from a dialysis fluid source to the dialyser and remove a second volume of dialysis fluid from the dialyser. This allows the pumps assembly roles to be swapped.

The control system may be operable to alternate the pump assembly responsible for delivering the first volume of dialysis fluid to the dialyser and the pump assembly responsible for removing the second volume of dialysis fluid from the dialyser after a given number inlet pump of cycles.

Each of the inlet pump assembly and the outlet pump assembly may be defined in part by a flexible membrane, the flexible membrane may be independently operable between an open position and a closed position for each of the inlet pump assembly and the outlet pump assembly.

The inlet pump assembly may comprise a first pump operable to deliver a volume of dialysis fluid from a dialysis fluid source to the dialyser, a first dialyser inlet valve arranged between the first pump and an inlet of the dialyser and a first dialyser outlet valve arranged between an outlet of the dialyser and the first pump, wherein each of the valves and pumps are independently operable The outlet pump assembly may comprise a second pump for operable to remove a volume of dialysis fluid from the dialyser and deliver said dialysis fluid to a drain, a second dialyser outlet valve arranged between an outlet of the dialyser and the second pump and a second dialyser inlet valve arranged between the second pump and an inlet of the dialyser, wherein each of the valves and pumps are independently operable The pump and valve arrangement may further comprise a first dialysis fluid source valve arranged between the dialysis fluid source and the first pump.

The pump and valve arrangement may further comprise a second dialysis fluid source valve arranged between the dialysis fluid source and the second pump The pump and valve arrangement may further comprise a first drain valve arranged between the first pump and the drain.

The pump and valve arrangement may further comprise a second drain valve arranged between the second pump and the drain.

According to a second aspect of the present invention there is provided a dialysis system comprising the pump and valve arrangement according to the first aspect of the invention.

According to a third aspect of the present invention there is provided a method of cleaning a semi-permeable membrane of a dialyser, the method comprising the steps of: providing a pump and valve arrangement, the pump and valve arrangement comprising the dialyser having the semi-permeable membrane, an inlet pump assembly, an outlet pump assembly, a blood circuit and a control system; providing a source of blood analogue fluid and supplying the blood analogue fluid to the blood circuit; operating the inlet pump assembly in an inlet pump assembly cycle to deliver a first volume of a cleaning fluid from a cleaning fluid source to the dialyser, each inlet pump assembly cycle including a cleaning fluid delivery stroke; operating the outlet pump assembly in an outlet pump assembly cycle to remove a second volume of the cleaning fluid from the dialyser and draw the second volume of cleaning fluid away from the dialyser 12, each outlet pump assembly cycle including a cleaning fluid removal stroke; and either operating the inlet pump assembly in a shuttle cycle, to shuttle the first volume of cleaning fluid between the inlet pump assembly and the dialyser 12 one or more times before the cleaning fluid delivery stroke, or operating the outlet pump assembly in a shuttle cycle, to shuttle the second volume of cleaning fluid between the outlet pump assembly and the dialyser 12 one or more times before the cleaning fluid removal stroke.

Any fluid may be used as the cleaning fluid. For instance, in some embodiments water may be used as the cleaning fluid. In other embodiments the cleaning fluid may comprise a solution, for instance a dialysate solution, or a solution containing a detergent.

Any fluid can be used as the blood analogue fluid. For instance, the blood analogue fluid may be water. Alternatively, the blood analogue fluid is a fluid designed to behave in a similar fashion to blood to enable the device to be tested. Blood plasma may be used as the analogue fluid. The blood analogue fluid may include a marker, such as a dye or a marker molecule which may be sensed using appropriate sensors.

The method may comprise the further step of operating the outlet pump assembly in a shuttle cycle, to shuttle the second volume of cleaning fluid between the outlet pump assembly and the dialyser one or more times before the cleaning fluid removal stroke.

The method may comprise the further step of synchronising the operations of the inlet pump assembly and outlet pump assembly so as to shuttle the first volume of cleaning fluid between the inlet pump assembly and the outlet pump assembly via the dialyser one or more times before the cleaning fluid delivery stroke.

The method may comprise the further step of maintaining inactive the other of the inlet pump assembly or the outlet pump assembly when operating the inlet pump assembly to shuttle or operating the outlet pump assembly to shuttle.

The method may comprise the further step of synchronising the operations of the inlet pump assembly and outlet pump assembly with a delay so as to shuttle the first volume of cleaning fluid between the inlet pump assembly and the outlet pump assembly via the dialyser 12 one or more times before the cleaning fluid delivery stroke.

The method may comprise synchronising the operations of the inlet pump assembly and outlet pump assembly so as to shuttle the first volume of cleaning fluid between the inlet pump assembly and the dialyser, and the second volume of cleaning fluid between the outlet pump assembly and the dialyser, at the same time, one or more times.

The inlet pump assembly and outlet pump assembly may both be operable to deliver a first volume of cleaning fluid from a cleaning fluid source to the dialyser and remove a second volume of cleaning fluid from the dialyser and deliver said cleaning fluid to a drain.

The method may comprise the further step of alternating the pump responsible for delivering the first volume of cleaning fluid to the dialyser and the pump responsible for removing the second volume of cleaning fluid from the dialyser after a given number of cycles.

The given number of cycles may be between 5 and 30. The given number of cycles may be 20.

BRIEF DESCRIPTION OF THE DRAWINGS

Embodiments of the present invention will now be described, by non-limiting example only, with reference to the accompanying drawings, in which:

FIGS. 5 to 10 show idealized schematics for flow to and from the dialyser according to different pumping cycles.

DESCRIPTION OF EMBODIMENTS OF THE INVENTION

The following detailed description and figures provide examples of how the present invention can be implemented and should not be seen as limiting examples, rather illustrations of how the various features of the convective operation device disclosed herein can be used. Other optional variations will be evident upon a reading of the following description in light of the figures.

Figure 1:
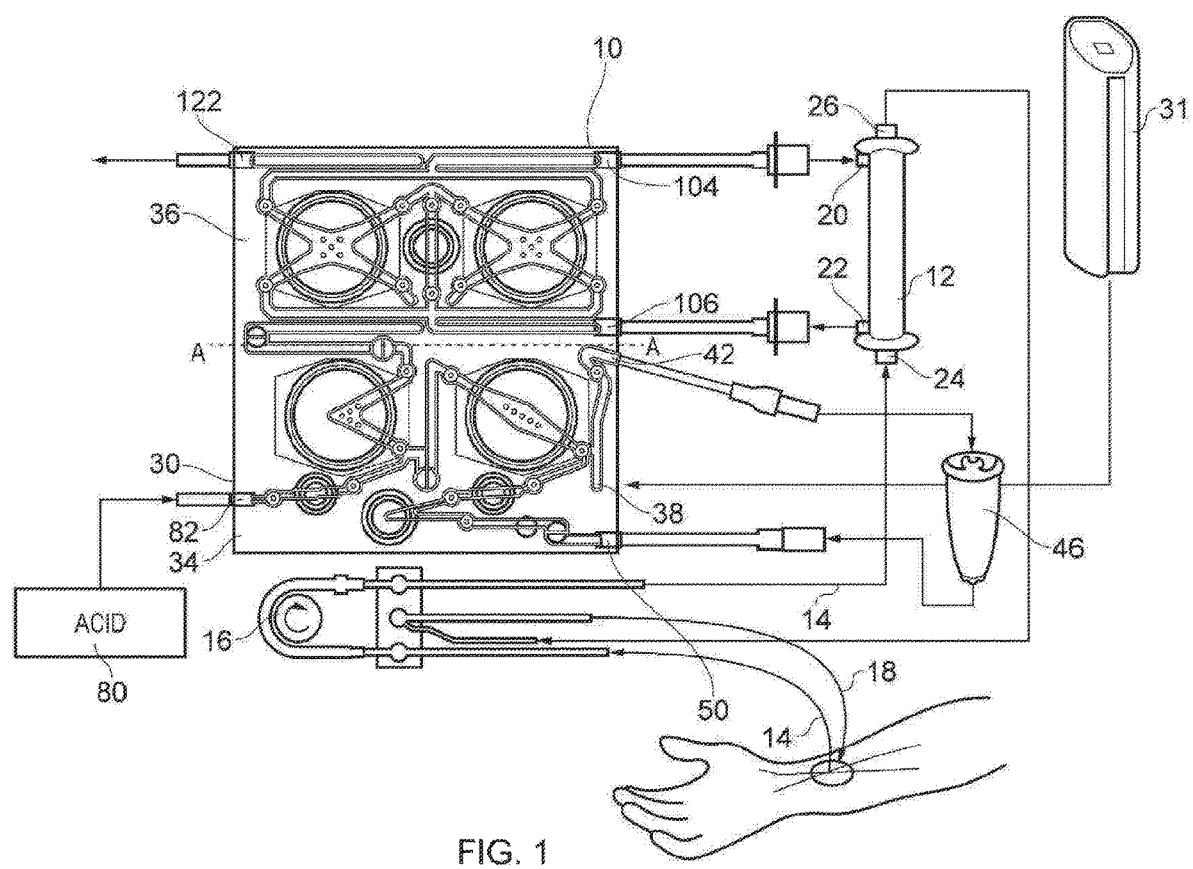
FIG. 1 shows a schematic of a dialysis system having a disposable cartridge comprising a fluid path defined by pumps and valves.
Figure 2:
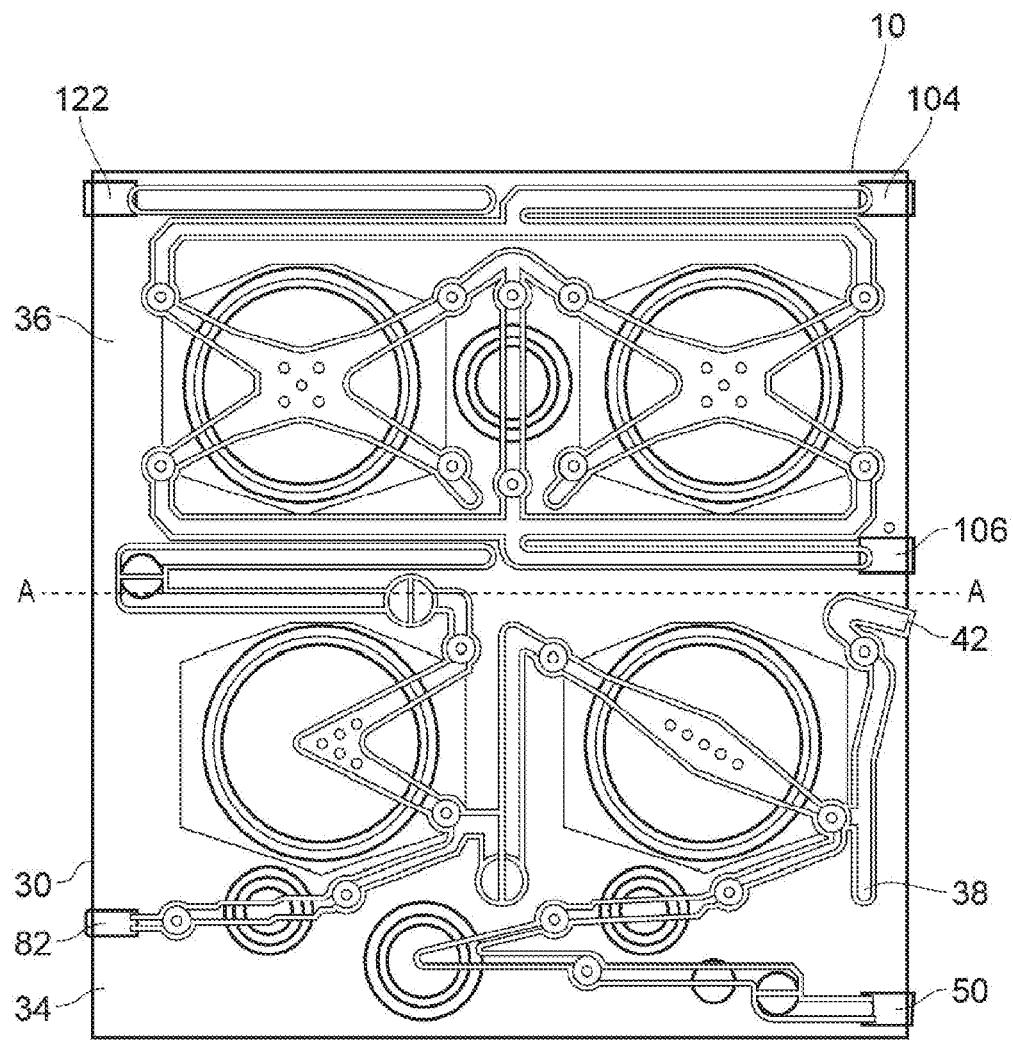
FIG. 2 shows a detailed schematic view of the cartridge of FIG. 1.

Referring to FIGS. 1 and 2, a dialysis system, generally referred to as 10, is shown. A dialyser 12 receives blood via an arterial line 14 connected to a patient by a vascular access device (not shown for clarity), for example a hollow needle as typically used for drawing blood from a patient. The blood is pumped from the patient to the dialyser by a peristaltic pump 16. The blood passes through the dialyser in a known manner and is returned to the patient via a venous line 18. The dialyser 12 comprises a cylindrical tube closed by opposing ends. A semi-permeable membrane (not shown) is provided within the dialyser tube and separates the patient's blood from a dialysis fluid. The term "dialysis fluid" used herein does not require that a solution designed to clinical tolerances be used, however a solution designed to within clinical tolerances may be advantageous. The membrane extends substantially between the opposing ends of the cylinder. The dialysis fluid solution removes impurities from the patient's blood in a known manner.

The dialyser has a dialysis fluid solution inlet 20 for receiving clean dialysis fluid solution and a dialysis fluid solution outlet 22 for removing spent dialysis fluid solution from the dialyser 12. The dialyser also has a blood inlet 24 for receiving untreated blood from the peristaltic pump 16 and a blood outlet 26 for returning processed blood to the patient. The dialyser 12 is typically provided in a substantially upright orientation, in use, with the patient's blood flowing longitudinally through the dialyser 12 from the blood inlet 24 to the blood outlet 26. The dialysis fluid solution inlet 20 and dialysis fluid solution outlet 22 are configured to be orientated substantially orthogonal to the blood inlet 24 and blood outlet 26, and configured to provide a counter-flow. Dialysis fluid solution is circulated through the hemodialysis machine at a fluid flow rate typically in the range of 500 ml/min to 800 ml/min for approximately four hours.

The dialysis system defines a fluid circuit including a cartridge 30 as will now be described. The cartridge 30 is a consumable component in the hemodialysis machine described.

The cartridge 30 is formed from an acrylic plastic such as SG-10 and has a machine side and a patient side. The cartridge 30 defines pump chambers which are closed by respective diaphragms, formed from, for example, DEHP-free PVC, to define respective pumps. In this embodiment, each diaphragm is part of a single, common sheet of material applied to the machine side of the cartridge 30. The individual diaphragms are operable by pneumatic pressure applied thereto.

A series of flow paths are formed in the cartridge 30 for carrying dialysis fluid solution constituted from water, bicarbonate solution and acid solution. The bicarbonate may be provided from a bicarbonate source 46 fluidly connected to the cartridge 30 and the acid from an acid source fluidly connected to the cartridge 30. The flow paths are located between the sheet of material closing the machine side of the cartridge 30 and a further sheet of the same material closing the patient side of the cartridge 30.

In use, the variation of pressure applied to the flexible diaphragm of each pump chamber is controlled by conventional valving. A pressure source applies either a positive or negative pressure to one side of the diaphragm of each pump chamber, as required, to pump fluid through the fluid paths in the cartridge 30, in a circuit defined by a plurality of valves.

The valves of the cartridge 30 are diaphragm valves defined by respective openings in the cartridge 30 and closed by respective flexible diaphragms. Each valve is operable by applying a negative pressure to the diaphragm to open the valve and applying a positive pressure to the diaphragm to close the valve. The diaphragm of each valve is part of the single, common sheet of material applied to the machine side of the cartridge 30. The valves are opened and closed according to a flow control strategy, as will become apparent.

The machine side of the cartridge 30 abuts a pump driver (not shown) comprising a platen having a plurality of recessed surfaces, each recessed surface substantially corresponding in geometry and volume to a pump chamber defined in the cartridge 30. Each recessed surface has a fluid port connectable with a source of positive fluid, typically, pressure and, with a source of negative fluid pressure via a valve.

Figure 4:
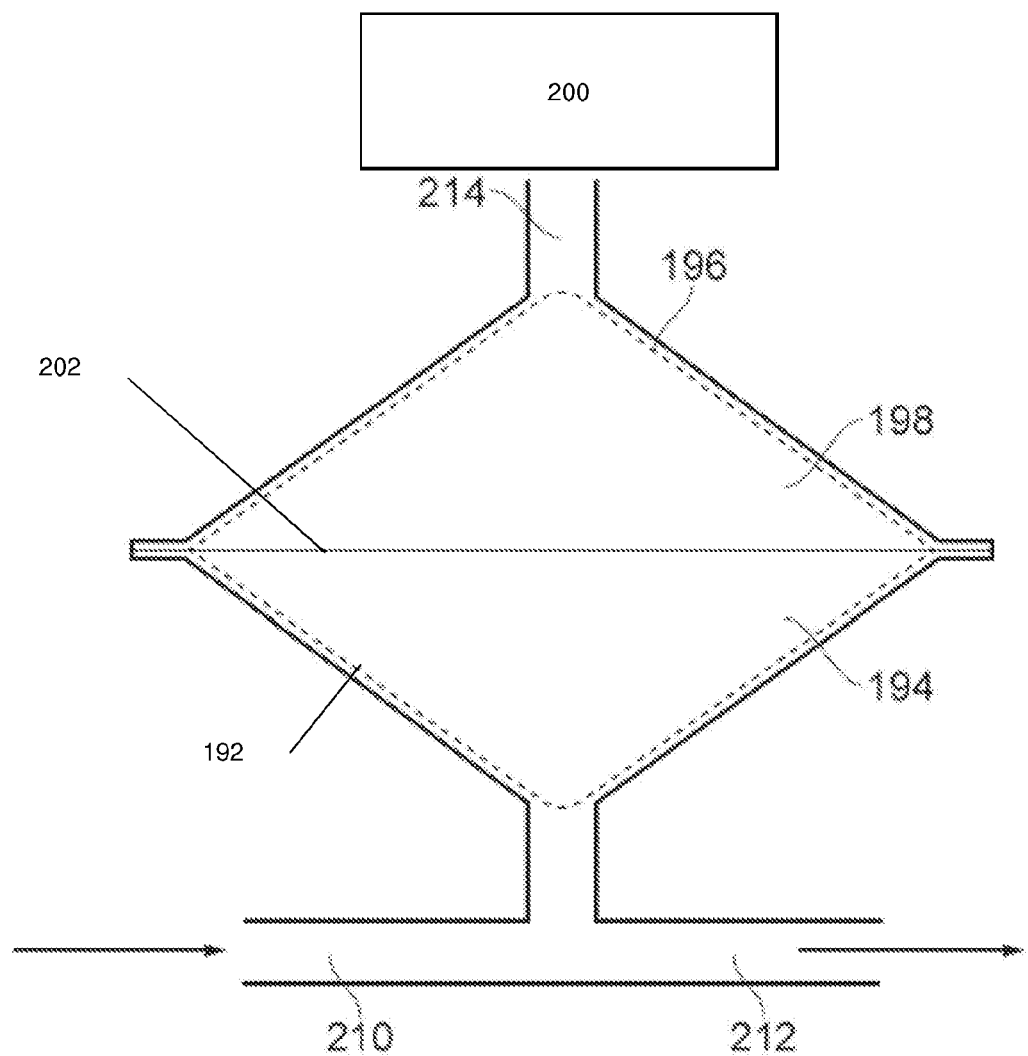
FIG. 4 shows a schematic cross-section through a pump of the type defined by the disposable cartridge.

A cartridge fluid pump and corresponding platen chamber are shown in FIG. 4. The positive and negative fluid pressure sources 200 include a pressure pump and a vacuum pump respectively. When the valve is operated to allow fluid to flow via channel 214 into a recessed surface from the source of positive fluid pressure, the flexible membrane or diaphragm 202 moves into a corresponding pump chamber 194 and any fluid, i.e. dialysis fluid solution, therein is expelled from that pump chamber via the series of flow paths 210, 212. The direction of flow through flow paths 210, 212 being determined by valves (not shown). This flexible membrane or diaphragm 202 position is shown by dotted line 192. When the valve is operated to allow fluid to flow out of a recessed surface to the source of negative fluid pressure, the flexible membrane or diaphragm 202 is moved away from the pump chamber 194 and into the corresponding recessed surface 198 to permit fluid to be drawn into that pump chamber via the series of flow paths 210, 212. This flexible membrane or diaphragm 202 position is shown by the dotted line 196. The surface of the pump chambers and of the platen provide a positive stop for each diaphragm 202, to prevent overstretching thereof. The positive stop ensures that the volume of fluid drawn into and pumped from the pump chambers is accurately controlled.

The cartridge 30 has two main functions, preparation of dialysis fluid solution and flow balance. Each function is performed by a separate part of the cartridge as illustrated in FIGS. 1 and 2 by the schematic separation of the cartridge into two parts by the line A-A in the figures. The dialysis fluid preparation function is performed by one part of the cartridge, generally referred to at 34 and the flow balance function is performed by the other part of the cartridge, generally referred to at 36. The cartridge 30 prepares an accurately mixed homogenous dialysis fluid solution and ensures that the flow of clean dialysis fluid supplied to the dialyser 12 matches (to within clinical tolerances) the volume of spent dialysis fluid drawn from the dialyser 12.

The cartridge 30 is provided with a plurality of connections to and from the cartridge 30 as described below. A first inlet port 38, from hereon referred to as the water inlet port, defined in the machine side of the cartridge 30 receives purified water from a purified water supply 31 such as a reverse osmosis water supply.

A first outlet port 42, from hereon referred to as the water outlet port, defined in an edge of the cartridge 30 directs the purified water to a first dialysis fluid solution constituent which, in the illustrated embodiment shown in FIGS. 1 and 2, is bicarbonate in bicarbonate source 46.

A second inlet port 50, from hereon referred to as the bicarbonate inlet port, defined in the same edge of the cartridge 30 as the water outlet port 42 receives purified water mixed with the bicarbonate from the bicarbonate source 46.

A third inlet port 82, from hereon referred to as the acid inlet port, defined in the opposite edge of the cartridge 30 to the water outlet port 42 and bicarbonate inlet port 50 receives a second dialysis fluid solution constituent which, in the illustrated embodiment shown in FIGS. 1 and 2, is acid from acid source 80.

A second outlet port 104, from hereon referred to as the clean dialysis fluid solution outlet port, is defined in the same edge of the cartridge as the water outlet port 42 and the bicarbonate inlet port 50. The clean dialysis fluid outlet port 104 directs clean dialysis fluid solution to the dialyser 12.

A fourth inlet port 106, from hereon referred to as the spent dialysis fluid solution inlet port, is defined in the same edge of the cartridge 30 as the water outlet port 42, bicarbonate inlet port 50 and clean dialysis fluid outlet port 104. The spent dialysis fluid solution inlet port 106 receives spent dialysis fluid solution from the dialyser 12.

A third outlet port 122, from hereon referred to as the drain port, is defined in the same edge of the cartridge as the acid inlet port 82. The drain port 122 directs spent dialysis fluid solution out of the cartridge 30.

Operation of the Device

Figure 3:
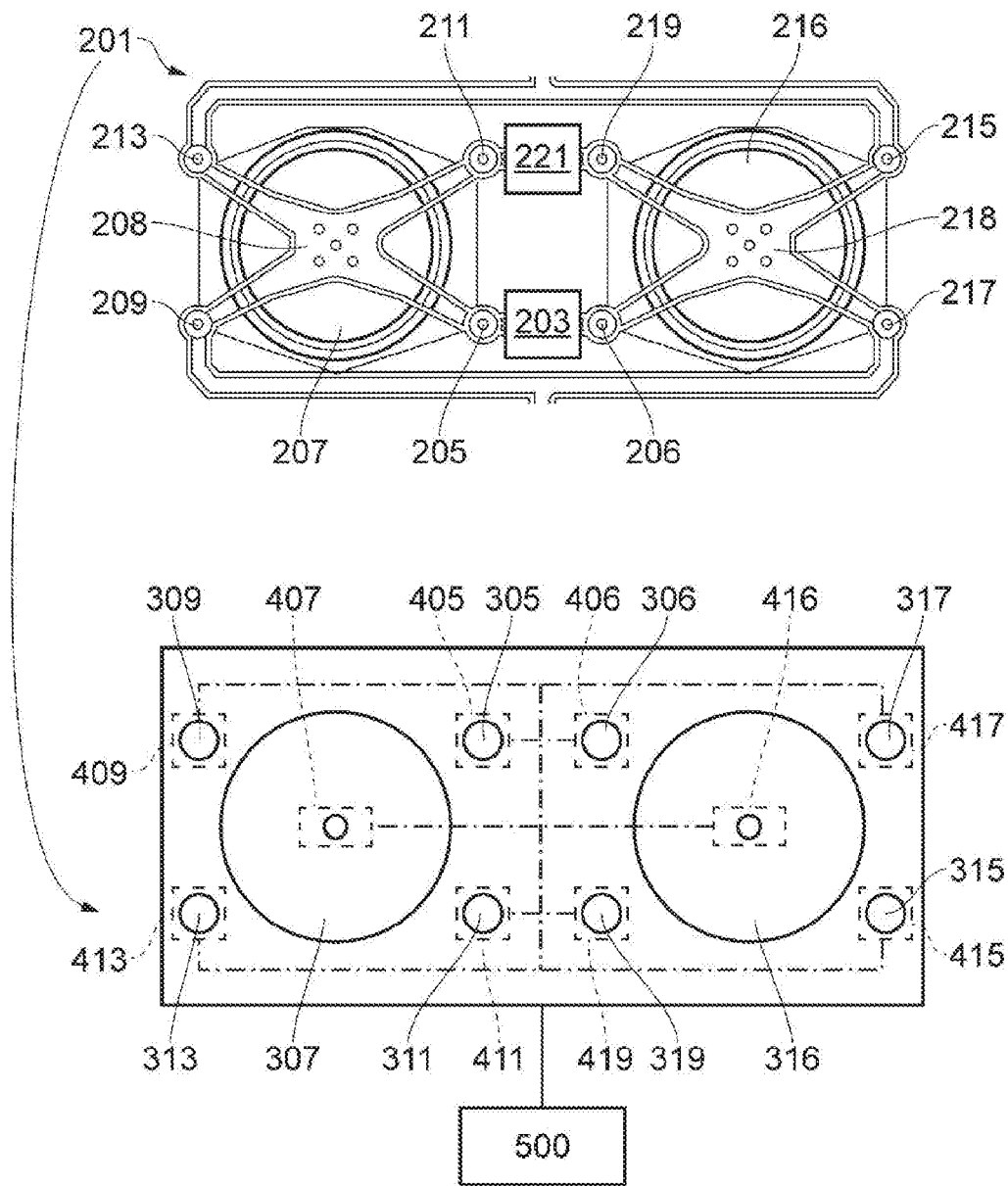
FIG. 3 shows a schematic representation of a pump and valve arrangement.

FIG. 3 shows a schematic representation of the pump and valve arrangement 201 of the invention. In this case, the pump and valve arrangement 201 is provided by the combination of a membrane pump cartridge (or part cartridge) and a vacuum pump array with platen. The membrane pump cartridge is similar in layout to the flow balance pump arrangement described above.

The membrane pump cartridge comprises first and second dialysis fluid source valves 205, 206, first and second pumps 207, 216 and first and second pump chambers 208, 218, first and second dialyser inlet valves 209, 217, first and second dialyser outlet valves 213, 215 and first and second drain valves 211, 219.

The vacuum pump array and platen comprises a platen having a pattern of circular depressions which correspond in position and size to the valves and pumps on the pump cartridge. In the figure, these are numbered 100 higher than the membrane pump features.

Each depression has an aperture at the base thereof which is in fluid communication with an associated vacuum pump. Each vacuum pump, shown in broken lines as they sit on the rear face of the platen, is numbered 100 higher than the respective associated platen feature.

All of the vacuum pumps are connected to a control system 450. The control system 450 is a microprocessor which operates the vacuum pumps 405-419 in a manner so as to effect either convective operation or haemodialysis as described below. The connection to the pumps may be wired or wireless. Wireless connection options include IR, Bluetooth or WIFI, amongst others.

The dialysis fluid is produced elsewhere on the cartridge by mixing acid and bicarbonate compounds with a set volume of water provided by a reverse osmosis machine which has been sterilized. This forms the dialysis fluid source 203 shown schematically in FIG. 3 which is used by the pump and valve arrangement 201. Also shown schematically in FIG. 3 is a drain 221. Both the dialysis fluid source 203 and the drain 221 are fluidly connectable to the first pump chamber 208 and the second pump chamber 218.

All valves and pumps are independently operable. In one embodiment, all pumps 207, 216 and all valves 205, 206, 211, 209, 213, 215, 217, 219 are independently operable by pneumatic pressure applied to the flexible membrane.

By selectively operating the vacuum pumps, the control system controls the opening and closure of the valves as well as actuation of the first and second pumps. The microprocessor control system is programmable to operate the valves in a variety of different configurations. Based on the programming of the control system 450, the control system 450 will communicate with each of the valves or means for operating the valves, so that each valve may be opened and closed independently based on the programming entered into the control system 450 by the user, skilled operator or program instructions.

The apparatus described can be used in two different modes: haemodialysis (HD) mode and haemodiafiltration (HDF) mode, as will be described in more detail below.

Haemodialysis (HD) Mode

A Haemodialysis (HD) mode pumping cycle of the arrangement 201 begins with closure of the first and second dialyser inlet valves 209, 217 and the first and second dialyser outlet valves 213, 215. The first dialysis fluid source valve 205 and the second drain valve 219 are opened, the second source valve 206 and first drain valve 211 are closed. The first pump 207 is then operated to draw dialysis fluid from the dialysis fluid source 203 into the first pump chamber 208 of the first pump 207 and the second pump 216 is operates to expel dialysis fluid within the second pump chamber 218 of the second pump 216 into the drain 221.

Accordingly, the dialysis fluid in the dialysis fluid source 203 is drawn into the first pump chamber 208 by the negative pressure created as the membrane of the first pump chamber 208 is drawn away from the pump chamber by vacuum means in the dialysis machine (not shown). The dialysis fluid in the second pump chamber 218 is subjected to a positive pressure as the membrane in the second pump 216 is forced into the second pump chamber 218 thus driving the dialysis fluid out through the open second drain valve 219 to be discarded.

Thus before commencement of the dialyser pumping cycle, the first pump chamber 208 is filled with fresh dialysis fluid and the second pump chamber 218 is emptied of spent dialysis fluid.

In the first step of the pump cycle, the first dialyser inlet valve 209 and the second dialyser outlet valve 215 are opened and the first dialysis fluid source valve 205 and the second drain valve 219 are closed. The first pump 207 is then actuated to expel the dialysis fluid from within the first pump chamber 208 into the dialyser 12 (not shown in FIG. 3) and simultaneously the second pump 216 is actuated to pull spent dialysis fluid from the dialyser 12 into the second pump chamber 218. In this step, the dialysis fluid in the first pump chamber 208 has a positive pressure applied to it as the membrane is forced down into the first pump chamber 208 thereby forcing the dialysis fluid through the dialysis circuit and into the dialyser. In the dialyser 12, dialysis fluid is passed in a counterflow arrangement to the blood of the patient and waste products diffuse across the dialyser membrane into the dialysis fluid via diffusion. The movement of the dialysis fluid through the dialyser 12 and into the second pump chamber 218 is assisted by a negative pressure generated by the membrane of the second pump chamber which is retracted by the vacuum means on the dialysis machine, operated by the control system 450.

Thus in step 1 the first pump chamber 208 delivers fresh dialysis fluid to the dialyser 12 in a dialysis fluid delivery stroke and simultaneously the second pump chamber 218 draws spent dialysis fluid from the dialyser 12 in a dialysis fluid removal stroke.

As such the first pump 207, first dialyser inlet valve 209, and the first source valve 205 comprise an inlet pump assembly configured to deliver a first volume of dialysis fluid from the dialysis fluid source 203 to the dialyser in an inlet pump cycle having a dialysis fluid delivery stroke, and the second pump 216, second dialyser outlet valve 215 and the second drain valve 219 comprise an outlet pump assembly configured to remove a second volume of dialysis fluid from the dialyser and deliver the dialysis fluid away from the dialyser in an outlet pump cycle having a dialysis fluid removal stroke.

In step 2 of the pump cycle, the first dialyser inlet valve 209 and second dialyser outlet valve 215 are closed, the second drain valve 219 is opened and second pump 216 actuated to expel the spent dialysis fluid from the second pump chamber 218 into the drain 221.

Steps 1 and 2 are repeated 20 times.

Accordingly, after the completion of step 2, both pump chambers 208, 218 are empty.

The roles of the first and second pumps 207, 216 can then be reversed. In order to enact the pump swap, the contents of the first pump 207 are expelled to drain 221 (step 3) and then the second drain valve 219 is closed and the second source valve 206 is opened in order to allow the second pump 216 to draw dialysis fluid from the dialysis fluid source 203 into the second pump chamber 218.

In step 5, with the second pump chamber 218 now filled, the second dialyser inlet valve 217 the first dialyser outlet valves 213 are opened and the second dialysis fluid source valve 206 is closed. The second pump 216 is actuated to expel the dialysis fluid in the second pump chamber 218 into the dialyser 12 and the first pump 207 is actuated to draw dialysis fluid from the dialyser 12 into the first pump chamber 208. This allows the same operation as was carried out in steps 1 and 2 to proceed but with the roles of the pumps 207, 216 swapped around. Thus any small discrepancies between the volumes of the two pump chambers 208, 218 are cancelled out.

As such the second pump 216, second dialyser inlet valve 217, and the second dialysis fluid source valve 206 comprise an inlet pump assembly configured to deliver a first volume of dialysis fluid from the dialysis fluid source 203 to the dialyser in an inlet pump cycle having a dialysis fluid delivery stroke, and the first pump 207, first dialyser outlet valve 213 and the first drain valve 211 comprise an outlet pump assembly configured to remove a second volume of dialysis fluid from the dialyser and deliver the dialysis fluid away from the dialyser in an outlet pump cycle having a dialysis fluid removal stroke.

In step 6 the first dialyser outlet valve 213 and second dialyser inlet valve 217 are closed, the first drain valve 211 and second dialysis fluid source valve 206 are opened and the first pump 207 is operated to expel the dialysis fluid from the first pump chamber 208 into the drain 221 whilst the second pump 216 draws dialysis fluid from the dialysis fluid source 203 into the second pump chamber 218.

Steps 5 to 6 are repeated 20 times.

The pumping cycle of the Haemodialysis (HD) mode of operation is summarised in table 1 below.

TABLE 1

HD pumping cycle with pump swap

| Step | First Pump (207) | Second Pump (216) | Dialyser flow |
|---|---|---|---|
| Pumping cycle First Pump 207 to Second Pump 216 | | | |
| Step 1 | Expel to dialyser Empty | Draw from dialyser Full | Flow |
| Step 2 | Draw from source Full | Expel into drain Empty | Static |
| Repeat steps 1 and 2 e.g. 20 times, then pump swap Pump swap | | | |
| Step 3 | Expel into drain Empty | No action Empty | Static |
| Step 4 | No action Empty | Draw from source Full | Static |
| Pumping cycle Second Pump 216 to First Pump 207 | | | |
| Step 5 | Draw from dialyser Full | Expel to dialyser Empty | Flow |
| Step 6 | Expel into drain Empty | Draw from source Full | Static |
| Repeat steps 5 and 6 e.g. 20 times, then pump swap back Pump swap | | | |
| Step 7 | No action Empty | Expel into drain Empty | Static |
| Step 8 | Draw from source Full | No action Empty | Static |
| Repeat from Step 1 | | | |

The pumping cycle of the Haemodialysis (HD) mode of operation gives a flow rate of 500 ml/min through the dialyser when the pump chambers 208, 218 are sized to 22 ml and operated at a frequency of 0.2 Hz. There is no dwell time at this rate, i.e. the duty cycle is 100%.

For pumping cycles where a lower flow rate is required, a number of pauses may be introduced into the pumping sequence. This is because at lower flow rates the fill and empty time of the first and second pump chambers 208, 218 remains the same and the duty cycle is reduced. Thus there is a period of time available when there is no net flow into and out of the dialysis fluid side of the dialyser 12, and the first pump 207 and the second pump 216 are effectively paused.

For example if the dialysis fluid flow rate is reduced to 10% (5 ml/min) then the first pump 207 and the second pump 216 are effectively paused for 90% of the time.

At all times blood on the blood side of the dialyser 12 continues to flow through the dialyser 12.

Therefore the duty cycle of the pumps 207, 216 is reduced to achieve lower dialysis fluid flow rates through the dialyser.

Referring to FIGS. 5 and 6, two idealized schematics for flow to and from the dialyser according to different pumping regimes are shown.

FIG. 5 shows a normal flow rate pumping regime 500, with flow to the dialyser 12 shown on the positive y-axis 502, flow from the dialyser 12 shown on the negative y-axis 504 and time shown on the x-axis 506. The dashed line 510 represents the first pump 207 flow. The dotted line 520 represent second pump 216 flow.

As previously described in Table 1, for normal haemodialysis treatment, the pump cycles are synchronized such that as first pump 207 pumps dialysis fluid to the dialyser 12, second pump 216 draws dialysis fluid from the dialyser 12, (step 1). This is represented by the two square forms identified as 530 for flow to the dialyser 12 and 540 for flow from the dialyser 12. Then, as first pump 207 draws dialysis fluid from the dialysis fluid source 203, second pump 216 expels dialysis fluid to the drain 221 (step 2) there is no flow to and from the dialyser 12, represented by the flat forms generally identified as 550. This pumping cycle 560 is repeated six times.

FIG. 6 shows a lower flow rate pumping regime 600. Similar reference numerals are used throughout, pre-fixed with a "6" rather than a "5" to indicate that those reference numerals relate to the lower flow rate pumping regime 600 rather than the normal flow rate pumping regime 500.

In the same time period as for the normal flow rate pumping regime 500, the lower flow rate pumping regime 600 has only a single pumping cycle 660. The single pumping cycle 660 is preceded by a period of time where there is no flow to and from the dialyser 12, represented by the elongate flat section 670 of lines 610, 620 of the first pump 207 flow and the second pump 216 flow. Thus the duty cycle of the lower flow rate pumping regime 600 is 16.6% as compared to the 100% duty cycle of the normal flow rate pumping regime 500.

HD Shuttling

In a pumping cycle of the present invention, additional shuttling pump steps are added. The movement of the dialysis fluid is referred to as longitudinal with respect to the semi-permeable membrane of the dialyser 12.

Thus new steps 1a and 1b are effected ahead of the dialyser flow step (step 1). Most importantly, these shuttling pump steps are timed to occur whilst the first pump 207 and the second pump 216 would have otherwise been paused.

The new steps 1a and 1b are known as shuttling steps. These increase flow of dialysis fluid along the semi-permeable membrane of the dialyser 12.

The shuttling steps may take place irrespective of which pump 207, 216 is being used to expel dialysis fluid to the dialyser 12. As such, for simplicity, Table 2 does not show the shuttling steps for the pumping cycle second pump 216 to first pump 207, nor the pump swap steps.

TABLE 2

HD pumping cycle shuttling

| Step | First Pump (207) | Second Pump (216) | Dialyser flow |
|---|---|---|---|
| Shuttling First Pump 207 to Second Pump 216 | | | |
| Step 1a | Expel to dialyser Empty | Draw from dialyser Full | Flow |
| Step 1b | Draw from dialyser Full | Expel to dialyser Empty | Reverse flow |
| Repeat steps 1a and 1b as desired before step 1 | | | |
| Pumping cycle First Pump 207 to Second Pump 216 | | | |
| Step 1 | Expel to dialyser Empty | Draw from dialyser Full | Flow |
| Step 2 | Draw from source Full | Expel into drain Empty | Static |
| Repeat steps 1a, 1b, 1 and 2 e.g. 20 times, then pump swap | | | |

The new steps 1a and 1b may be performed one or more times. For example for the 10% duty cycle discussed above, 90% of the time may be used for shuttling (i.e. step 2a followed by step 2b).

Because Steps 1a and 1b synchronise the operation of the first pump 207 and the second pump 216, there is no change in transmembrane pressure in the dialyser 12. There is a large change in flow along the dialyser membrane which acts to agitate and wash the surface of the dialyser membrane.

FIG. 7 shows the lower flow rate pumping regime of FIG. 6, however with the addition of 5 shuttling steps. Similar reference numerals are used throughout, pre-fixed with a "7" rather than a "6" to indicate that those reference numerals relate to a lower flow rate pumping regime with HD shuttling 700 rather than the lower flow rate pumping regime 600.

In the same time period as for the normal flow rate pumping regime 500, and the lower flow rate pumping regime 600, the lower flow rate pumping cycle with HD shuttling 700 has only a single pumping cycle 760. The single pumping cycle 760 is preceded by a period of time where shuttling occurs, generally designated 770.

Specifically, the first pump 207 expels dialysis fluid to the dialyser 12, with the dashed line 710 representing the first pump 207 flow returning a positive y-axis 702 value. At the same time the second pump 216 draws dialysis fluid from the dialyser 12, with the dotted line 720 representing the second pump 216 flow returning a negative y-axis 704 value, (step 1a).

Subsequently, the first pump 207 draws dialysis fluid from the dialyser 12, with the dashed line 710 representing the first pump 207 flow returning a negative y-axis 704 value. At the same time the second pump 216 expels dialysis fluid to the dialyser 12, with the dotted line 720 representing the second pump 216 flow returning a positive y-axis 702 value, (step 1b).

This double pump shuttle sequence 780 is repeated five times in total. During this double pump shuttle sequence 780, dialysis fluid is not entering or leaving the dialysis system, the dialysis fluid is agitating a surface of the semi-permeable membrane of the dialyser 12.

Haemodiafiltration (HDF)

The same pump and valve arrangement 201 may be used to effect haemodiafiltration (HDF). In HDF dialysis fluid is forced across the semi-permeable membrane of the dialyser 12 from the dialysis fluid side to the blood side, and vice-versa in order to provide additional clearance through convection.

HDF Single Pump Shuttling

In contrast to the haemodialysis modes described above, the shuttling steps may not operate with pump movements that are directly synchronised with each other. Instead, some pump movements are split between the pauses, or dwell times when otherwise no pumps would be actuated. The movement of the dialysis fluid is referred to as transverse with respect to the semi-permeable membrane of the dialyser 12.

TABLE 3

HDF pumping cycle shuttling

| Step | First Pump (207) | Second Pump (216) | Dialyser flow |
|---|---|---|---|
| Shuttling First Pump 207 to Dialyser 12 | | | |
| Step 1a | Expel to dialyser Empty | No Action | Flow |
| Step 1b | Draw from dialyser Full | No Action | Reverse flow |
| Repeat steps 1a and 1b as desired before step 1 | | | |

TABLE 3-continued

HDF pumping cycle shuttling

| Step | First Pump (207) | Second Pump (216) | Dialyser flow |
|---|---|---|---|
| Pumping cycle First Pump 207 to Second Pump 216 | | | |
| Step 1 | Expel to dialyser Empty | Draw from dialyser Full | Flow |
| Step 2 | Draw from source Full | Expel into drain Empty | Static |
| Repeat steps 1a, 1b, 1 and 2 e.g. 20 times, then pump swap | | | |

The new steps 1a and 1b may be performed one or more times.

As such, for the steps 1a and 1b, the first pump 207, first dialyser inlet valve 209, and the first source valve 205 comprise an inlet pump assembly configured to deliver a first volume of dialysis fluid from the dialysis fluid source 203 to the dialyser 12 in an inlet pump cycle having a dialysis fluid delivery stroke and the same pump and valves additionally comprise the inlet pump assembly configured to shuttle dialysis fluid between the inlet pump assembly and the dialyser 12 one or more times so as to agitate the surface of the semi-permeable membrane of the dialyser 12. That is a reverse flow is permitted through the first dialyser inlet valve 209. Alternatively the first dialyser outlet valve 213 may be used to permit the shuttling flow from the dialyser 12 to the inlet pump assembly.

Because steps 1a and 1b split the operation of the first pump 207 and the second pump 216, there is a change in transmembrane pressure in the dialyser according to the In-Flow and the Out-Flow. This provides and enhanced HDF effect as well as generally agitating and scrubbing the semi-permeable membrane of the dialyser.

Not shown in the Table 3, but equally possible, HDF shuttling may alternatively be achieved using the second pump 216. That is, the second pump 216, second dialyser inlet valve 217, and the second source valve 206 comprise an inlet pump assembly configured to deliver a first volume of dialysis fluid from the dialysis fluid source 203 to the dialyser in an inlet pump cycle having a dialysis fluid delivery stroke, and the same pump and valves additionally comprise the inlet pump assembly configured to shuttle dialysis fluid between the inlet pump assembly and the dialyser one or more times so as to agitate the surface of the semi-permeable membrane of the dialyser. That is a reverse flow is permitted through the second dialyser inlet valve 219. Alternatively the second dialyser outlet valve 215 may be used to permit the shuttling flow from the dialyser 12 to the inlet pump assembly.

As will be understood, it is not essential to use both the first pump 207 and the second pump 216 for the shuttling steps, as flow balance remains unaffected.

FIG. 8 shows the lower flow rate pumping cycle of FIG. 6, however with the addition of 5 shuttling steps. Similar reference numerals are used throughout, pre-fixed with a "8" rather than a "6" to indicate that those reference numerals relate to a lower flow rate pumping cycle with HDF shuttling 800 rather than the lower flow rate pumping cycle 600.

In the same time period as for the normal flow rate pumping cycle 500, and the lower flow rate pumping cycle 600, the lower flow rate pumping cycle with HDF shuttling 800 has only a single pumping cycle 860. The single pumping cycle 860 is preceded by a period of time where HDF shuttling occurs, generally designated 870.

Specifically, the first pump 207 expels dialysis fluid to the dialyser 12, with the dashed line 810 representing the first pump 207 flow returning a positive y-axis 702 value. At the same time, for the first iteration only the second pump 216 draws dialysis fluid from the dialyser 12, with the dotted line 720 representing the second pump 216 flow returning a negative y-axis 704 value.

From then on, for each time the first pump 207 expels dialysis fluid to the dialyser 12, the second pump 216 is inactive, with the dotted line 720 representing the second pump 216 flow returning a zero y-axis 704 value (step 1a).

Subsequently, the first pump 207 draws dialysis fluid from the dialyser 12, with the dashed line 710 representing the first pump 207 flow returning a negative y-axis 704 value. At the same time the second pump 216 remains inactive (step 1b).

This single pump shuttle sequence 880 is repeated four times in total. During this single pump shuttle sequence 880, dialysis fluid is entering and leaving the dialysis system across the semi-permeable membrane of the dialyser 12, as well as agitating a surface of the semi-permeable membrane of the dialyser 12.

Just as the inlet pump assembly may be configured to shuttle dialysis fluid between the inlet pump assembly and the dialyser one or more times, so can the outlet pump assembly.

In the case of the first pump 207, either the flow through the first dialyser outlet valve 213 can be reversed to return dialysis fluid to the dialyser 12 or the first dialyser inlet valve 209 may be used.

In the case of the second pump 216, the flow through the second dialyser outlet valve 215 can be reversed to return dialysis fluid to the dialyser 12 or the second dialyser inlet valve 217 may be used.

When using the outlet pump assembly to shuttle dialysis fluid, the dialysis fluid is partially spent dialysis fluid.

Phased Shuttling

FIG. 9 shows the lower flow rate pumping cycle of FIG. 6, however with the addition of 5 shuttling steps. Similar reference numerals are used throughout, pre-fixed with a "9" rather than a "6" to indicate that those reference numerals relate to a lower flow rate pumping cycle with phased shuttling 900 rather than the lower flow rate pumping cycle 600.

In the same time period as for the normal flow rate pumping cycle 500, and the lower flow rate pumping cycle 600, the lower flow rate pumping cycle with phased shuttling 900 has only a single pumping cycle 960. The single pumping cycle 960 is preceded by a period of time where phased shuttling occurs, generally designated 970.

Specifically, the first pump 207 expels dialysis fluid to the dialyser 12, with the dashed line 910 representing the first pump 207 flow returning a positive y-axis 902 value. At the same time for the first iteration only the second pump 216 draws dialysis fluid from the dialyser 12, with the dotted line 920 representing the second pump 216 flow returning a negative y-axis 904 value.

Subsequently, the first pump 207 draws dialysis fluid from the dialyser 12, with the dashed line 910 representing the first pump 207 flow returning a negative y-axis 904 value. At the same time for the first iteration only the second pump 216 expels dialysis fluid to the dialyser 12, with the dotted line 920 representing the second pump 216 flow returning a positive y-axis 902 value. However the second pump 216 terminates the expulsion of dialysis fluid to the dialyser 12 ahead of the first pump 207 finishing drawing dialysis fluid from the dialyser 12, shown by the gap between the vertical portions of the dashed line 910 representing the first pump 207 flow and the dotted line 920 represent second pump 216 flow. This delay or gap defines a period of transverse in-flow 990 across the dialyser membrane when waste compounds are dragged from a patient side of the dialyser membrane to a dialysis fluid side of the dialyser membrane by convection. This is because the second pump begins to draw dialysis fluid from the dialyser 12 at the same time that the first pump 207 continues to draw dialysis fluid from the dialyser 12.

This is followed by a period of longitudinal flow 992, where the first pump 207 and the second pump 216 are in-phase and therefore act in a similar manner to the double pump shuttle sequence 780 described with respect to FIG. 7.

However, as the, second pump 216 expels dialysis fluid to the dialyser 12 before the first pump 207 commences to draw dialysis fluid from the dialyser 12, another gap is defined, this time as a period of transverse out-flow 994 across the dialyser membrane when dialysate is forcibly returned to the patient side of the dialyser membrane from the dialysis fluid side of the dialyser membrane.

Thus during the period of transverse in-flow 990 and the period of transverse out-flow 994, the first pump 207 and the second pump 216 are out of phase and a HDF effect is caused, with the associated change in transmembrane pressure.

Conversely, in the remainder of the low flow phased shuttle sequence 980, defined as the two separate periods of longitudinal flow 992, the first pump 207 and the second pump 216 are in phase and thus there is only longitudinal flow along the dialysis membrane.

During this phased shuttle sequence 980, a combined effect is achieved with dialysis fluid is entering and leaving the dialysis system across the semi-permeable membrane of the dialyser 12 (transverse flow), as well as agitating a surface of the semi-permeable membrane of the dialyser 12 (longitudinal flow).

The ratio of longitudinal flow versus transverse flow is variable, by altering the size of the period of transverse in-flow 990 and the period of transverse out-flow 994 relative to the two periods of longitudinal flow 992 in each phased shuttle sequence 980. The control system 450 may be configured to set this ratio.

HDF Twin Pump Shuttling

FIG. 10 shows the lower flow rate pumping cycle of FIG. 6, however with the addition of 5 shuttling steps. Similar reference numerals are used throughout, pre-fixed with a "10" rather than a "6" to indicate that those reference numerals relate to a lower flow rate pumping cycle with HDF twin pump shuttling 1000 rather than the lower flow rate pumping cycle 600.

In the same time period as for the normal flow rate pumping cycle 500, and the lower flow rate pumping cycle 600, the lower flow rate pumping cycle with HDF twin pump shuttling 1000 has only a single pumping cycle 1060. The single pumping cycle 1060 is preceded by a period of time where HDF twin pump shuttling occurs, generally designated 1070.

Specifically, the first pump 207 expels dialysis fluid to the dialyser 12, with the dashed line 1010 representing the first pump 207 flow returning a positive y-axis 1002 value. At the same time, for the first iteration only the second pump 216 draws dialysis fluid from the dialyser 12, with the dotted line 1020 representing the second pump 216 flow returning a negative y-axis 1004 value.

From then on, for each time the first pump 207 expels dialysis fluid to the dialyser 12, the second pump 216 also expels dialysis fluid to the dialyser 12 (step 1). Subsequently, the first pump 207 draws dialysis fluid from the dialyser 12, with the dashed line 1010 representing the first pump 207 flow returning a negative y-axis 1004 value. At the same time the second pump 216 draws dialysis fluid from the dialyser 12 (step 2).

This twin pump shuttle sequence 1080 is repeated four times in total. During this twin pump shuttle sequence 1080, dialysis fluid is entering and leaving the dialysis system across the semi-permeable membrane of the dialyser 12, as well as agitating a surface of the semi-permeable membrane of the dialyser 12.

LIST OF REFERENCE NUMERALS dialysis system 10
dialyser 12
arterial line 14
peristaltic pump 16
venous line 18
dialysis fluid solution inlet 20
dialysis fluid solution outlet 22
blood inlet 24
blood outlet 26
cartridge 30
purified water supply 31
dialysis fluid preparation function portion 34
flow balance function portion 36
water inlet port 38
water outlet port 42
bicarbonate source 46
bicarbonate inlet port 50
acid source 80
acid inlet port 82
clean dialysis fluid solution outlet port 104
spent dialysis fluid solution inlet port 106
drain port 122
dotted line 192
pump chamber 194
dotted line 196
recessed surface 198
positive and negative fluid pressure sources 200
pump and valve arrangement 201
diaphragm 202
dialysis fluid source 203
first dialysis fluid source valve 205
second dialysis fluid source valve 206
first pump 207
first pump chamber 208
first dialyser inlet valve 209
flow path 210
first drain valve 211
flow path 212
first dialyser outlet valve 213
channel 214
second dialyser outlet valve 215
second pump 216
second dialyser inlet valve 217
second pump chamber 218
second drain valve 219
drain 221
platen depression first dialysis fluid source valve 305
platen depression second dialysis fluid source valve 306
platen depression first pump 307
platen depression first dialyser inlet valve 309
platen depression first drain valve 311
platen depression first outlet valve 313
platen depression second dialyser outlet valve 315 platen depression second pump 316
platen depression second dialyser inlet valve 317
platen depression second drain valve 319
vacuum pump first dialysis fluid source valve 405
vacuum pump second dialysis fluid source valve 406
vacuum pump first pump 407
vacuum pump first dialyser inlet valve 409
vacuum pump first drain valve 411
vacuum pump first outlet valve 413
vacuum pump second dialyser outlet valve 415
vacuum pump second pump 416
vacuum pump second dialyser inlet valve 417
vacuum pump second drain valve 419
control system 450
normal flow rate pumping regime 500
positive y-axis 502; 602; 702; 802; 902; 1002
negative y-axis 504; 604; 704; 804; 904; 1004
x-axis 506; 606; 706; 806; 906; 1006
dashed line 510; 610; 710; 810; 910; 1010
dotted line 520; 620; 720; 820; 920; 1020
two square forms 530, 540; 630, 640; 730, 740; 830, 840; 930, 940; 1030, 1040;
no flow 550; 650; 750; 850; 950; 1010
pumping cycle 560; 660; 760; 860; 960; 1060
lower flow rate pumping regime 600
lower flow rate pumping regime with HD shuttling 700
lower flow rate pumping cycle with HDF shuttling 800
lower flow rate pumping cycle with phased shuttling 900
lower flow rate pumping cycle with HDF twin pump shuttling 1000
elongate flat section 670
shuttling period 770; 870; 970; 1070
double pump shuttle sequence 780
single pump shuttle sequence 880
phased shuttle sequence 980
period of transverse in-flow 990
period of longitudinal flow 992
period of transverse out-flow 994
twin pump shuttle sequence 1080

The invention claimed is:

1. A dialysis system comprising:
a dialyser including a semi-permeable membrane;
an inlet pump assembly operable to deliver a first volume of dialysis fluid from a dialysis fluid source to the dialyser in an inlet pump cycle having a dialysis fluid delivery stroke;
an outlet pump assembly operable to remove a second volume of dialysis fluid from the dialyser and deliver the second volume of dialysis fluid away from the dialyser in an outlet pump cycle having a dialysis fluid removal stroke; and
a control system configured to operate the inlet pump assembly in a plurality of instances of the inlet pump cycle, and operate the outlet pump assembly in a plurality of instances of the outlet pump cycle, wherein each instance of the inlet pump cycle includes a corresponding instance of the outlet pump cycle, wherein:
the control system is further configured to operate the inlet pump assembly to shuttle the respective first volume of dialysis fluid of one of the plurality of instances of the inlet pump cycle between the inlet pump assembly and the dialyser one or more times to agitate a surface of the semi-permeable membrane of the dialyser or
to operate the outlet pump assembly to shuttle the respective second volume of dialysis fluid of one of the plurality of instances of the outlet pump cycle between the outlet pump assembly and the dialyser one or more times to agitate a surface of the semi-permeable membrane of the dialyser, and
the control system is further configured to synchronise the inlet pump assembly and outlet pump assembly to shuttle the first volume of dialysis fluid between the inlet pump assembly and the outlet pump assembly via the dialyser one or more times.

2. The dialysis system according to claim 1, wherein the control system is configured to synchronise the inlet pump assembly and outlet pump assembly so-as-to shuttle the first volume of dialysis fluid between the inlet pump assembly and the dialyser, and the second volume of dialysis fluid between the outlet pump assembly and the dialyser, at the same time, one or more times.

3. The dialysis system according to claim 1, wherein the inlet pump assembly and the outlet pump assembly are both operable to deliver the first volume of dialysis fluid from a dialysis fluid source to the dialyser and remove the second volume of dialysis fluid from the dialyser.

4. The dialysis system according to claim 1, wherein each of the inlet pump assembly and the outlet pump assembly are defined in part by a flexible membrane, the flexible membrane being independently operable between an open position and a closed position for each of the inlet pump assembly and the outlet pump assembly.

5. The dialysis system according to claim 1, wherein the outlet pump assembly includes a pump operable to remove a volume of dialysis fluid from the dialyser and deliver said dialysis fluid to a drain, a dialyser outlet valve arranged between a dialysis fluid outlet of the dialyser and the pump and a dialyser inlet valve arranged between the pump and a dialysis fluid inlet of the dialyser, wherein each of the valves and pumps are independently operable.

6. A dialysis system comprising:
a dialyser including a semi-permeable membrane;
an inlet pump assembly operable to deliver a first volume of dialysis fluid from a dialysis fluid source to the dialyser in an inlet pump cycle having a dialysis fluid delivery stroke;
an outlet pump assembly operable to remove a second volume of dialysis fluid from the dialyser and deliver the second volume of dialysis fluid away from the dialyser in an outlet pump cycle having a dialysis fluid removal stroke; and
a control system configured to operate the inlet pump assembly in a plurality of instances of the inlet pump cycle, and operate the outlet pump assembly in a plurality of instances of the outlet pump cycle, wherein each instance of the inlet pump cycle includes a corresponding instance of the outlet pump cycle, wherein:
the control system is further configured to operate the inlet pump assembly to shuttle the respective first volume of dialysis fluid of one of the plurality of instances of the inlet pump cycle between the inlet pump assembly and the dialyser one or more times to agitate a surface of the semi-permeable membrane of the dialyser or
to operate the outlet pump assembly to shuttle the respective second volume of dialysis fluid of one of the plurality of instances of the outlet pump cycle between the outlet pump assembly and the dialyser one or more times to agitate a surface of the semi-permeable membrane of the dialyser, and
to maintain an inactive state of the other of the inlet pump assembly or the outlet pump assembly when operating the inlet pump assembly to shuttle or operating the outlet pump assembly to shuttle.

7. The dialysis system according to claim 6, wherein the inlet pump assembly and the outlet pump assembly are both operable to deliver the first volume of dialysis fluid from a dialysis fluid source to the dialyser and remove the second volume of dialysis fluid from the dialyser.

8. The dialysis system according to claim 6, wherein each of the inlet pump assembly and the outlet pump assembly are defined in part by a flexible membrane, the flexible membrane being independently operable between an open position and a closed position for each of the inlet pump assembly and the outlet pump assembly.

9. A dialysis system comprising:
a dialyser including a semi-permeable membrane;
an inlet pump assembly operable to deliver a first volume of dialysis fluid from a dialysis fluid source to the dialyser in an inlet pump cycle having a dialysis fluid delivery stroke;
an outlet pump assembly operable to remove a second volume of dialysis fluid from the dialyser and deliver the second volume of dialysis fluid away from the dialyser in an outlet pump cycle having a dialysis fluid removal stroke; and
a control system configured to operate the inlet pump assembly in a plurality of instances of the inlet pump cycle, and operate the outlet pump assembly in a plurality of instances of the outlet pump cycle, wherein each instance of the inlet pump cycle includes a corresponding instance of the outlet pump cycle, wherein:
the control system is further configured to operate the inlet pump assembly to shuttle the respective first volume of dialysis fluid of one of the plurality of instances of the inlet pump cycle between the inlet pump assembly and the dialyser one or more times to agitate a surface of the semi-permeable membrane of the dialyser or
to operate the outlet pump assembly to shuttle the respective second volume of dialysis fluid of one of the plurality of instances of the outlet pump cycle between the outlet pump assembly and the dialyser one or more times to agitate a surface of the semi-permeable membrane of the dialyser, and
to synchronise the inlet pump assembly and outlet pump assembly with a delay between the beginning of each one of the plurality of instances of the inlet pump cycle and the end of each respective one of the plurality of instances of the outlet pump cycle to shuttle the respective first volume of dialysis fluid between the inlet pump assembly and the outlet pump assembly via the dialyser one or more times.

10. The dialysis system according to claim 9, wherein the control system is further configured to set the length of the delay.

11. The dialysis system according to claim 9, wherein the inlet pump assembly and the outlet pump assembly are both operable to deliver the first volume of dialysis fluid from a dialysis fluid source to the dialyser and remove the second volume of dialysis fluid from the dialyser.

12. The dialysis system according to claim 9, wherein each of the inlet pump assembly and the outlet pump assembly are defined in part by a flexible membrane, the flexible membrane being independently operable between an open position and a closed position for each of the inlet pump assembly and the outlet pump assembly.

* * * * *